UNITED STATES PATENT OFFICE 2,295,074

METHOD OF PURIFYING PHENOTHIAZINE

Edgar C. Britton and Joseph E. Eisenman, Midland, Mich., assignors to The Dow Chemical Company, Midland, Mich., a corporation of Michigan No Drawing. Application April 10, 1941, Serial No. 387,861

16 Claims. (Cl. 260—243)

This invention concerns a method of purifying phenothiazine.

Phenothiazine is a well-known compound which is used as an insecticide and as an anthelmintic for the internal treatment of animals. The literature describes it as a crystalline yellow compound which melts at 180° C. and turns green on exposure to light and air, but it is not readily obtainable in such form. The compound as prepared by usual methods, e. g. the reaction of sulphur or sulphur chloride with diphenylamine, is usually of lower melting point, of objectionable odor and of an off-color ranging from orange to green to black; particularly when halogen-containing catalysts such as aluminum chloride, aluminum bromide, chlorine, bromine, or iodine, etc., have been used in the reaction.

The impurities in such usual product are not definitely known, but they probably include oxygen-, sulphur- and/or halogen-derivatives of phenothiazine as well as the catalyst and excess sulphur when used. Our attempts to purify the product by usual purification procedures, e. g. by recrystallization from solvents or by distillation, have been unsatisfactory. For instance, the product obtained by distilling the crude phenothiazine under vacuum was badly discolored and of foul odor.

We have discovered that the phenothiazine may be decolorized, i. e. be obtained in substantially its true color of cream to yellow, by treating the same with a common metal of melting point between 200° and 1100° C. and then distilling. In many instances these treatments alone suffice for satisfactory purification. However, the distilled product sometimes retains an objectionable odor and possesses a greenish tint or rapidly turns green on exposure to light and air. We have further found that the impurities accountable for the odor and the discoloration may be removed by washing with any of a wide variety of organic liquids which are non-solvents or only poor solvents for phenothiazine itself. This washing operation is preferably carried out subsequent to the treatment with the metal and the distillation, but it may precede these operations if desired. We have further found that phenothiazine having the melting point of 180° C. reported in the literature is not entirely pure and that the pure compound melts at a temperature of 186°–186.5° C. In addition, we have found that although carefully purified phenothiazine may gradually develop a green color on prolonged exposure to light and air, it is quite stable against such discoloration. For instance, samples of phenothiazine purified by the present method have remained of creamish-yellow color after more than two months of exposure to air and ordinary daylight. However, such complete purification is not ordinarily required. Phenothiazine which melts at 180° C. and is of cream to yellow or orange-yellow color and which does not turn green on standing for one day under exposure to light and air, is of good quality and is satisfactory for many purposes.

The expression "common metals" as herein employed refers generically to the elements which have pronounced metallic properties and which are neither noble nor rare. It excludes the elements such as gold, cerium, germanium, neodynium, praesodynium, radium, tellurium, selenium, thallium, and arsenic which are noble, rare, or which possess acidic properties and are for most purposes not employed in metallic state. Thus the common metals which have melting points between 200° and 1100° C. are alumium, antimony, barium, bismuth, cadmium, calcium, copper, lead, magnesium, silver, strontium, tin, and zinc. Of these, the metals aluminum, copper, zinc, cadmium, magnesium, antimony, lead, and tin are preferred, since they are readily available as the free metals and are highly effective in the process.

The metal is preferably used in the form of a powder or small graules, e. g. of less than 50 mesh size, but it may be employed in other forms such as thin foils, sponge metal, etc., wherein a large proportion of the metal is exposed for reaction. The availability of the metal for reaction, and hence its apparent reactivity, increase of course with increase in the surfaces thereof relative to the absolute volume of the metal.

Although treatment with a common metal of melting point between 200° and 1100° C. is required in order to satisfactorily decolorize crude phenothiazine in accordance with the invention, it is not necessary that other metals be excluded from the mixture. For instance, a powdered mixture or alloy containing one or more of said common metals in chemically active form along with other metals such as iron, cobalt, nickel, manganese, or chromium, etc., may be used in the treatment. It is not necessary that such mixture or alloy have a melting point between 200° and 1100° C., but it is necessary that it contain a common metal which, when in pure form, has such melting point.

In decolorizing crude phenothiazine in accordance with the invention, the crude material is heated (preferably in a closed container with exclusion of air) to fusion in the presence of a common metal of melting point between 200° and 1100° C. which metal is of course employed as a powder or in other chemically active form. Only a small proportion, e. g. from 0.2 to 10 and preferably between 0.5 and 5 per cent, by weight of such metal is usually employed in the treatment, but it may be used in larger proportions if desired. For instance, the purification has been carried out successfully using the powdered metal in amount corresponding to 30 per cent by weight of the phenothiazine and larger proportions could undoubtedly be used.

The temperature required for fusion of the crude phenothiazine is, of course, dependent upon the impurities present, but is usually between 150° and 180° C. The mixture of fused phenothiazine and the metal is preferably stirred or otherwise agitated for a short time, e. g. from 10 to 30 minutes. The phenothiazine is then distilled under vacuum, usually at a pressure below 50 and preferably below 30 millimeters absolute.

The distilled phenothiazine is usually quite pure, e. g. of melting point 180° C. or above, and of cream to yellow color. However, it frequently retains an objectionable odor and possesses a greenish tint or rapidly turns green on exposure to light and air.

When necessary, the impurities accountable for the odor and the discoloration may be removed by grinding the product to a powder and washing it, e. g. at room temperature or above, with an organic liquid which at the temperature of the washing is either a non-solvent or only a poor solvent for phenothiazine itself. Any of a wide variety of organic liquids may be employed in the washing operation. Examples of such liquids are aliphatic hydrocarbons such as gasoline, ligroin and other liquid petroleum fractions; aromatic hydrocarbons such as benzene or toluene; halohydrocarbons such as carbon tetrachloride, chloroform, methylene bromide, ethylene chloride, propylene chloride, or chlorobenzene; alcohols such as methyl, ethyl, propyl, isopropyl, butyl, or amyl alcohol; and organic acids such as acetic or propionic acid; etc.

Although the washing operation is fairly effective in removing such impurities regardless of the particular organic liquid or mixture of organic liquids employed, the liquid halo-aliphatic hydrocarbons, especially carbon tetrachloride, are particularly effective in removing the odoriferous impurities and the alcohols are highly effective in removing the impurities which cause rapid discoloration of the phenothiazine under the action of light and air. Usually the distilled phenothiazine is washed with an equal weight or more of carbon tetrachloride and also of methyl or ethyl alcohol, which organic liquids may be applied consecutively or in admixture with one another as desired. Residual organic liquid is then evaporated from the pheno-thiazine, whereby the latter is obtained in purified form. The purified product is usually substantially odorless, has a melting point between 180° and 186.5° C. and is of cream to yellow or orange-yellow color.

The following examples illustrate certain ways in which the principle of the invention has been applied, but are not to be construed as limiting the invention.

Example 1

The following table gives the results obtained in a series of experiments on the purification of phenothiazine in accordance with the invention. The phenothiazine used as the starting material in each experiment was the crude product obtained by the catalytic reaction of sulphur with diphenylamine. The different samples of such starting material varied in color from green to nearly black and melted at 172°–175° C. or thereabout. In each experiment the crude phenothiazine was treated with the powdered metal named in the table in the per cent by weight also given. The mixture was heated in a closed container sufficiently to melt the phenothiazine for about 15 minutes and then distilled at an absolute pressure of about 25 millimeters of mercury. No attempt was made to fractionate the product during the distillation. The table gives the color and the melting point of the distilled product. For purpose of comparison, the table includes a run wherein the crude phenothiazine was distilled directly without preliminary treatment with a metal Table

| Run No. | Metal compound | | Distilled product | |
|---|---|---|---|---|
| | Kind | Per cent | Color | M. P., °C. |
| 1 | None | 0 | Brown | 178–181 |
| 2 | Zn | 1 | Cream | 182–185 |
| 3 | Zn | 2 | Cream | 183–185 |
| 4 | Zn | 2.5 | Cream | 182–185 |
| 5 | Cu | 2 | Orange-yellow | 180–183 |
| 6 | Al | 2 | Yellow | 179–182 |
| 7 | Mg | 2 | Light yellow | Not taken |
| 8 | Sn | 2 | Yellow | 180–184 |
| 9 | Sb | 5 | Orange-yellow | 179–182 |

Example 2

Powdered phenothiazine which had been rendered nearly pure by treatment with zinc dust and subsequent distillation but which possessed an objectionable odor and had turned light-green upon exposure to light and air was washed thoroughly with approximately 4 parts by weight of a mixture of equal volumes of carbon tetrachloride and methyl alcohol and then dried. The so-treated phenothiazine had a melting point of 185°–186° C. and was of a cream color having only a faint and barely discernible greenish tint. In the following claims where phenothiazine is referred to as being washed with an organic liquid in which it is "substantially insoluble," we mean that the liquid is one which at the temperature of washing dissolves not more than 10 per cent by weight of phenothiazine.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method of purifying phenothiazine which comprises heating the impure compound at a fusion temperature while in admixture with a common metal of melting point between 200° and 1100° C. in chemically active form, thereafter distilling the phenothiazine, and washing the distilled compound with an organic liquid in which phenothiazine is substantially insoluble.

2. The method of purifying phenothiazine which comprises forming a mixture of the impure phenothiazine and a finely divided common metal of melting point between 200° and 1100°

C., heating the mixture at a temperature sufficient to melt the phenothiazine, distilling phenothiazine from the mixture, comminuting the distilled phenothiazine and washing it with an organic liquid in which it is substantially insoluble.

3. The method of purifying phenothiazine which comprises admixing the impure compound with a minor proportion of a finely divided common metal of melting point between 200° and 1100° C., heating the mixture with agitation and while preventing free access of air at a temperature sufficient to fuse the phenothiazine, distilling phenothiazine from the resultant mixture and washing the distilled product with an organic liquid in which it is substantially insoluble.

4. The method of purifying phenothiazine which comprises admixing the impure compound with a minor proportion of a finely divided common metal of melting point between 200° and 1100° C., heating the mixture with agitation and while excluding air at a temperature sufficient to fuse the phenothiazine, distilling phenothiazine from the resultant mixture, and washing the distilled and comminuted phenothiazine with an organic liquid selected from the class consisting of alcohols and halo-aliphatic hydrocarbons.

5. The methol of purifying phenothiazine which comprises admixing the impure compound with a minor proportion of a finely divided common metal of melting point between 200° and 1100° C., heating the mixture with agitation in a closed vessel at a temperature sufficient to fuse the phenothiazine, distilling phenothiazine from the resultant mixture, and washing the distilled product with a liquid chlorinated aliphatic hydrocarbon.

6. The method of purifying phenothiazine which comprises admixing the impure compound with a minor proportion of finely divided common metal of melting point between 200° and 1100° C., heating the mixture with agitation in a closed vessel at a temperature sufficient to fuse the phenothiazine, distilling phenothiazine from the resultant mixture, and washing the distilled and comminuted product with carbon tetrachloride.

7. The method of purifying phenothiazine which comprises admixing the impure compound with a minor proportion of a finely divided common metal of melting point between 200° and 1100° C., heating the mixture with agitation in a closed vessel at a temperature sufficient to fuse the phenothiazine, distilling phenothiazine from the resultant mixture, and washing the distilled and comminuted product with a lower aliphatic alcohol.

8. The method of purifying phenothiazine which comprises admixing the impure compound with a minor proportion of powdered zinc, heating the mixture with agitation in a closed vessel at a temperature sufficient to fuse the phenothiazine, distilling phenothiazine from the resultant mixture, and washing the distilled and comminuted product with methyl alcohol and carbon tetrachloride.

9. In a method of purifying phenothiazine which is discolored by impurities incident to its manufacture, the steps for removing colored impurities which consist in admixing the impure phenothiazine with a common metal of melting point between 200° and 1100° C. in chemically active form, heating the mixture to a temperature sufficient to melt the phenothiazine, and distilling phenothiazine from the resultant mixture.

10. In a method of purifying phenothiazine which is discolored by impurities incident to its manufacture, the steps of removing colored impurities which comprise admixing the impure phenothiazine with a minor proportion of a finely divided common metal of melting point between 200° and 1100° C., heating the mixture to a temperature sufficient to melt the phenothiazine, and distilling phenothiazine from the resultant mixture.

11. In a method of purifying phenothiazine which is discolored by impurities incident to its manufacture, the steps of removing colored impurities which consist in admixing the impure phenothiazine with a minor proportion of a finely divided common metal of melting point between 200° and 1100° C., heating the mixture with agitation in a closed container at a temperature sufficient to melt the phenothiazine, and thereafter distilling phenothiazine from the resultant mixture.

12. In a method of purifying phenothiazine which is discolored by impurities incident to its manufacture, the steps of removing colored impurities which consist in admixing the phenothiazine with a minor proportion of powdered zinc, heating the mixture with agitation in a closed container at a temperature sufficient to melt the phenothiazine, and distilling phenothiazine from the resultant mixture.

13. In a method of purifying phenothiazine which contains an odoriferous impurity incident to its manufacture, the step of removing the odoriferous impurity by washing the phenothiazine with a liquid halo-aliphatic hydrocarbon.

14. In a method of purifying phenothiazine which contains an odoriferous impurity incident to its manufacture, the step of removing the odoriferous impurity by washing the phenothiazine wth carbon tetrachloride.

15. In a method of purifying phenothiazine to remove therefrom impurities of foul odor and which promote rapid discoloration of the product under the action of light and air, the step which consists in washing the phenothiazine with carbon tetrachloride and a lower aliphatic alcohol.

16. In a method of purifying phenothiazine to remove therefrom impurities of foul odor and which promote rapid discoloration of the product under the action of light and air, the step which consists in washing the phenothiazine with carbon tetrachloride and methyl alcohol.

EDGAR C. BRITTON.
JOSEPH E. EISENMAN.